United States Patent
Cardinaels et al.

(10) Patent No.: US 7,498,515 B2
(45) Date of Patent: Mar. 3, 2009

(54) TUBULAR CABLE ADAPTER FOR JOINING OR TERMINATING A MEDIUM-VOLTAGE CABLE

(75) Inventors: Josef Cardinaels, Wetteren (BE); Eduard de Ridder, Herdersem-Aalst (BE)

(73) Assignee: Nexans (FR)

( * ) Notice: Subject to any disclaimer, the term of this patent is extended or adjusted under 35 U.S.C. 154(b) by 0 days.

(21) Appl. No.: 11/715,269

(22) Filed: Mar. 7, 2007

(65) Prior Publication Data

US 2007/0256852 A1    Nov. 8, 2007

(30) Foreign Application Priority Data

Apr. 5, 2006    (FR) .................................... 06 51208

(51) Int. Cl.
*H02G 15/08* (2006.01)
(52) U.S. Cl. .................................... 174/93; 174/DIG. 8
(58) Field of Classification Search ................ 174/73.1, 174/74 A, 93, DIG. 8
See application file for complete search history.

(56) References Cited

U.S. PATENT DOCUMENTS

| | | | |
|---|---|---|---|
| 3,564,110 A * | 2/1971 | Biskeborn .................. | 174/22 R |
| 5,844,170 A | 12/1998 | Chor et al. ................. | 174/74 A |
| 5,906,952 A | 5/1999 | Everaere et al. ............. | 422/356 |
| 2001/0011599 A1* | 8/2001 | De Buyst ................... | 174/74 R |
| 2002/0070046 A1 | 6/2002 | Cardinaels et al. ......... | 174/68.1 |

FOREIGN PATENT DOCUMENTS

| | | |
|---|---|---|
| DE | 1569454 | 6/1980 |
| EP | 0780949 | 6/1997 |

OTHER PUBLICATIONS

French Search Report—Nov. 8, 2006.

* cited by examiner

*Primary Examiner*—Chau N Nguyen
(74) *Attorney, Agent, or Firm*—Sofer & Harow, LLP

(57) ABSTRACT

A cold-shrinkable element for joining or terminating electric cables, the element comprising a set of insulating or conductive layers, an outer protective sleeve, and a support element enabling said set of layers to be maintained in a radially-expanded state, the support element being suitable for being withdrawn from said assembly so as to allow the layers to shrink onto the cable or cables. According to the invention, the element comprises a metallized sheet disposed between said set of layers and said protective sleeve, together with a moisture-absorbing swelling layer disposed between said set of layers and said metallized sheet.

7 Claims, 1 Drawing Sheet

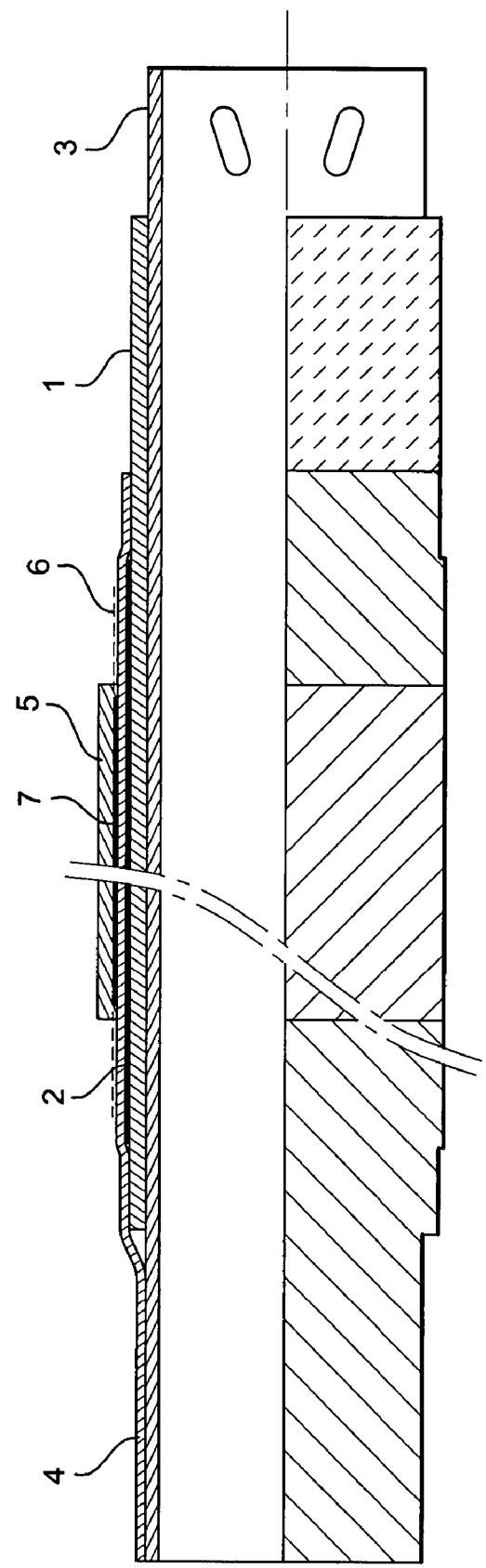
Figure unique

TUBULAR CABLE ADAPTER FOR JOINING OR TERMINATING A MEDIUM-VOLTAGE CABLE

RELATED APPLICATION

This application is related to and claims the benefit of priority from French Patent Application No. 06 51208, filed on Apr. 5, 2006, the entirety of which is incorporated herein by reference.

FIELD OF THE INVENTION

The invention relates to a tubular cable adapter for joining or terminating a medium-voltage cable.

BACKGROUND OF THE INVENTION

When paper-insulated cables are to be connected in a junction or a termination, it is known to apply a barrier layer over the insulating paper layers at the junction or termination accessories. The barrier sleeve protects the cable and provides a dry cable type interface onto which accessories for dry cables can be mounted.

An adapter capable of being installed in a single step is described in document EP 1 220 408.

That cold-shrink adapter comprises an insulating sleeve of silicone rubber, a conductive metal element constituted by a stocking of copper wires, a semiconductive layer of semiconductive silicone rubber situated between the insulating sleeve and the conductive metal element, and an outer protective sleeve covering the conductive metal element, in part. A support element enables that set of layers to be held in a radially-expanded state, with the support element being removable from said set of layers in order to cause the layers to shrink onto the cable or cables.

Once the adapter has been mounted, junction or termination accessories enclose the ends of the above-specified layers, covering the ends of the outer protective sleeve.

The problem raised by such an adapter is that the layers of rubber are not completely impermeable to moisture. When the junction or termination is installed in the ground and exposed to water, moisture penetrates slowly through these layers and is finally absorbed by the insulating paper of the cable or cables, which can lead to an electrical fault.

The Applicant has thus envisaged adding a fine and flexible metallized sheet compatible with cold-shrinking the adapter, between the conductive metal element and the outer protective sleeve, over a length longer than the length of the protective sleeve, the sheet projecting from both ends of the sleeve.

Nevertheless, it is found that even with a metallized sheet, such an adapter is not completely leaktight since, at the edges of the sheet, there remains a zone where moisture can infiltrate.

OBJECT AND SUMMARY OF THE INVENTION

The invention solves this problem of moisture that is harmful to good electrical operation, and to do so, it provides a cold-shrinkable element for joining or terminating electric cables, the element comprising a set of insulating or conductive layers, an outer protective sleeve, and a support element enabling said set of layers to be maintained in a radially-expanded state, the support element being suitable for being withdrawn from said assembly so as to allow the layers to shrink onto the cable or cables, the element including a metallized sheet disposed between said set of layers and said protective sleeve, together with a moisture-absorbing swelling layer disposed between said set of layers and said metallized sheet.

This swelling layer serves to capture the moisture entering the junction of the termination and prevents it from penetrating as far as the cable(s).

Preferably, said metallized sheet is of a length such that it projects from both ends of said outer protective sleeve.

Advantageously, said swelling layer is of length shorter than the length of said metallized sheet, and is totally covered thereby.

Said set of layers may comprise an insulating sleeve, a conductive metal element, and a semiconductive layer situated between the insulating sleeve and the conductive metal element.

Preferably, said swelling layer is constituted by a fiber tape encapsulating particles of swelling gel.

Said fibers may be made of polyester and said particles may be made of polyacrylate.

BRIEF DESCRIPTION OF THE DRAWING

The invention is described in greater detail below with reference to a FIGURE showing a preferred embodiment of the invention, for use in making a cable termination.

MORE DETAILED DESCRIPTION

The FIGURE is a fragmentary longitudinal section that has been greatly truncated lengthwise, showing a cold-shrinkable adapter for joining or terminating paper-insulated electric cables, the adapter comprising a set of insulating or conductive layers and an outer protective sleeve 5.

A tubular support element 3 enables this set of layers to be maintained in a radially expanded state, said support element being suitable for being withdrawn from the set in order to enable the layers to shrink onto the cable or cables of the termination or the junction.

The set of layers comprises an insulating sleeve 1 advantageously made of silicone rubber, a conductive metal element 4 preferably constituted by a stocking of copper wires, and a semiconductive layer 2 advantageously made of semiconductive silicone rubber and situated between the insulating sleeve 3 and the conductive metal element 4.

In order to provide moisture-proofing, a metallized sheet 6 is disposed between the conductive metal element and the outer protective sleeve over a length that is longer than the length of the outer protective sleeve 5, this sheet projecting from both ends of the sleeve 5.

According to the invention, a moisture-absorbing swelling layer 7 is placed between the set of layers and the metallized sheet 6. This layer 7 is of length shorter than the length of the metallized sheet and it is totally covered thereby.

The metallized sheet 6 and the swelling layer 7 may be formed by strips rolled one after the other around the set of layers.

The swelling layer 7 is preferably constituted by a fiber tape encapsulating particles of swelling gel. It is possible to use polyester fibers and particles of polyacrylate.

By way of example, a moisture-blocking strip can be used of the kind known under the trade name "GTI 1240" from the supplier Geca-Tapes.

For installation on the cable, the adapter is slid over the cable and, by withdrawing a tube of the support element 3, the entire assembly of layers shrinks against the cable, in a manner already described in patent document EP 1 220 408. At each end of the protective sleeve 5, the conductive metal element 4 is visible in order to enable electrical contact to be made.

More precisely, during installation, with the adapter seen in the configuration of the FIGURE, the free left end of the conductive metal element 4 and the metallized sheet 6 are folded over the protective sleeve 5. The support element 3 is then moved in translation over the cable so that the left end of the insulating sleeve 1 is positioned as close as possible to the location where the conductor or conductors are stripped of their common sheath, referred to as the end zone. The support element 3 is then pulled to the right under the insulating sleeve 1 by means of a hook that is fitted in orifices provided in the right-hand end thereof. By removing this support element, the set of layers is caused to shrink onto the conductor of the cable and transforms the paper-insulated conductor into a polymer-insulated cable, referred to as a dry cable.

The left-hand end of the conductive metal element 4 and the left-hand end of the metallized sheet 6 are then unfolded, the conductive metal element 4 overlying the screen of lead so as to be brought into electrical contact therewith, thus providing continuity of cable shielding.

With a three-phase cable, the conductive metal elements 4 are interconnected with the metal shielding of the cable and a trifurcation glove is fitted over the end zone. The fingers of the glove cover part of the left-hand end of the outer protective sleeve 5.

At the right-hand edge, the free ends of the conductive metal element 4 and of the metallized sheet 6 are then folded over the right-hand end of the outer protective sleeve. Thus, the end of the insulating sleeve 1 and the end of the semiconductive layer 2 are stripped over a certain length.

In this way and in a few simple steps, a three-phase cable insulated with oil-impregnated paper becomes a polymer-insulated cable with individually-shielded phases on which standard accessories designed for dry cables can be installed.

The central portion that is not covered by these accessories is protected from moisture effectively by the metallized sheet 6 and the swelling layer 7 situated under the outer protective sleeve 5.

Although the embodiment described above relates to making a cable termination, the invention naturally also applies to making a cable junction.

What is claimed is:

1. A cold-shrinkable element for joining or terminating electric power cables, the element comprising:
   a set of insulating or conductive layers, said set of layers includes an insulating sleeve, a conductive metal element, and a semiconductive layer situated between the insulating sleeve and the conductive metal element;
   an outer protective sleeve; and
   a support element enabling said set of layers to be maintained in a radially-expanded state, the support element being suitable for being withdrawn from said assembly so as to allow the layers to shrink onto the cable or cables, the element including a metallized sheet disposed between said set of layers and said protective sleeve, together with a moisture-absorbing swelling layer disposed between said set of layers and said metallized sheet.

2. An element according to claim 1, wherein said metallized sheet is of a length such that it projects from both ends of said outer protective sleeve.

3. An element according to claim 2, wherein said swelling layer is of length shorter than the length of said metallized sheet, and is totally covered thereby.

4. An element according to claim 1, wherein said swelling layer is constituted by a fiber tape encapsulating particles of swelling gel.

5. An element according to claim 4, wherein said fibers are made of polyester and said particles are made of polyacrylate.

6. A cold-shrinkable element for joining or terminating electric power cables, the element comprising:
   a set of insulating or conductive layers;
   an outer protective sleeve; and
   a support element enabling said set of layers to be maintained in a radially-expanded state, the support element being suitable for being withdrawn from said assembly so as to allow the layers to shrink onto the cables, the element including a metallized sheet disposed between said of layers and said protective sleeve, together with a moisture-absorbing swelling layer disposed between said set of layers and said metallized sheet, wherein said metallized sheet is of a length such that it projects from both ends of said outer protective sleeve.

7. A cold-shrinkable element for joining or terminating electric power cables, the element comprising:
   a set of insulating or conductive layers;
   an outer protective sleeve; and
   a support element enabling said set of layers to be maintained in a radially-expanded state, the support element being suitable for being withdrawn from said assembly so as to allow the layers to shrink onto the cable or cables, the element including a metallized sheet disposed between said set of layers and said protective sleeve, together with a moisture-absorbing swelling layer disposed between said set of layers and said metallized sheet, wherein said swelling layer is constituted by a fiber tape encapsulating particles of swelling gel.

* * * * *